United States Patent [19]
Hurmi

[11] Patent Number: 5,174,333
[45] Date of Patent: Dec. 29, 1992

[54] OUTPUT PRESSURE CONTROL APPARATUS

[75] Inventor: Darryl G. Hurmi, Elk Grove Village, Ill.

[73] Assignee: Landis & Gyr Powers, Inc., Buffalo Grove, Ill.

[21] Appl. No.: 713,654

[22] Filed: Jun. 11, 1991

[51] Int. Cl.$^5$ ............................................. F15B 1/00
[52] U.S. Cl. ................................. 137/550; 137/196.1; 137/596.17; 60/453; 60/454
[58] Field of Search ............... 137/550, 596.1, 596.17, 137/596, 557; 60/453, 454

[56] References Cited

U.S. PATENT DOCUMENTS

| | | | |
|---|---|---|---|
| 2,821,997 | 2/1958 | Clay et al. | 137/596.17 |
| 3,744,244 | 7/1973 | Swoager | 60/454 |
| 3,754,125 | 8/1973 | Rothstein | 364/500 |
| 3,948,207 | 4/1976 | St. Paul | 137/557 X |
| 3,963,048 | 6/1976 | Bowman | 137/596.17 |
| 4,469,594 | 9/1984 | Poetter | 60/454 X |
| 4,684,409 | 9/1987 | Lehman | 106/311 |
| 4,785,848 | 11/1988 | Leiber | 137/596.17 |
| 4,882,526 | 11/1989 | Iino et al. | 364/553 X |

Primary Examiner—John Rivell
Attorney, Agent, or Firm—Welsh & Katz, Ltd.

[57] ABSTRACT

An output pressure control apparatus particularly adapted for HVAC control applications, and being of the general type which admits a higher supply pressure to a controlled output line when it is desired to increase the pressure in the output line and which bleeds pressure from the controlled output line when it is desired to reduce the pneumatic output pressure. The pressure regulating apparatus requires only a single filter means and utilizes bidirectional flow of air through the filter means during normal operation which cleans the filter means.

42 Claims, 2 Drawing Sheets

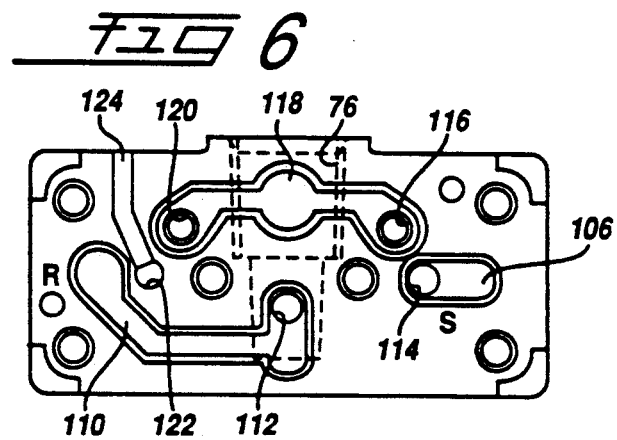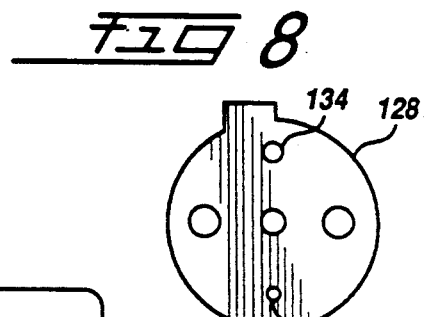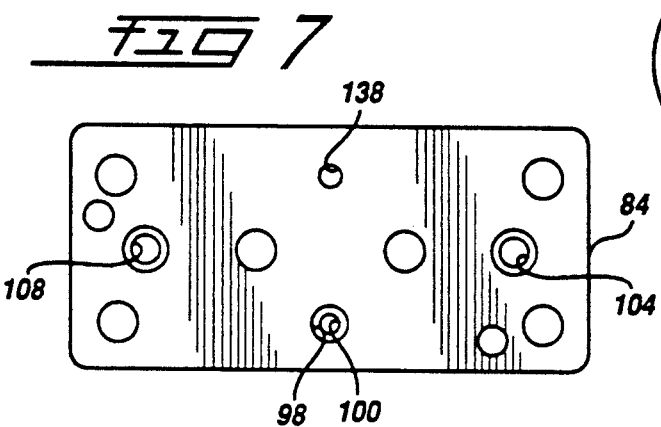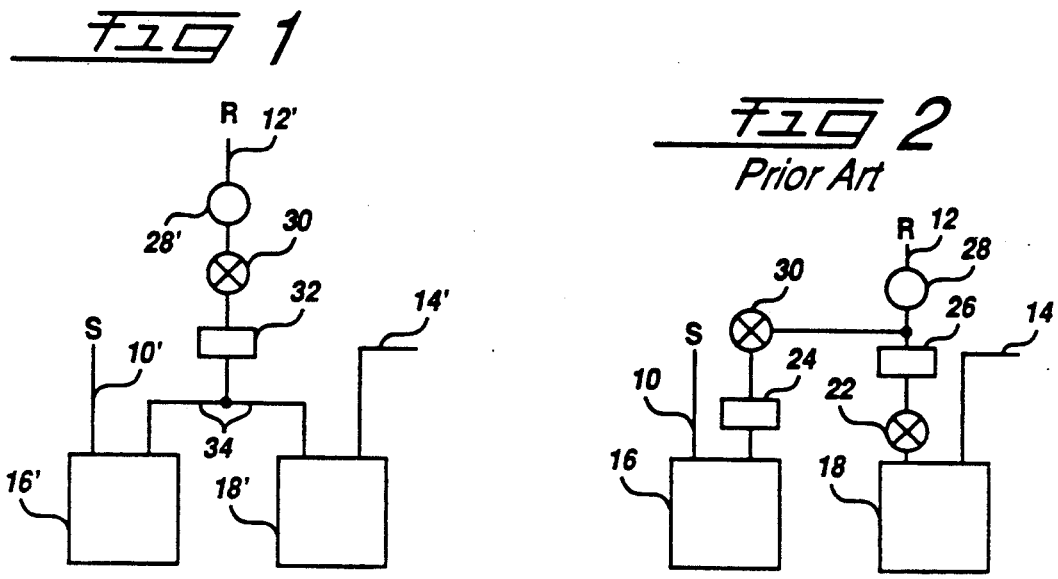

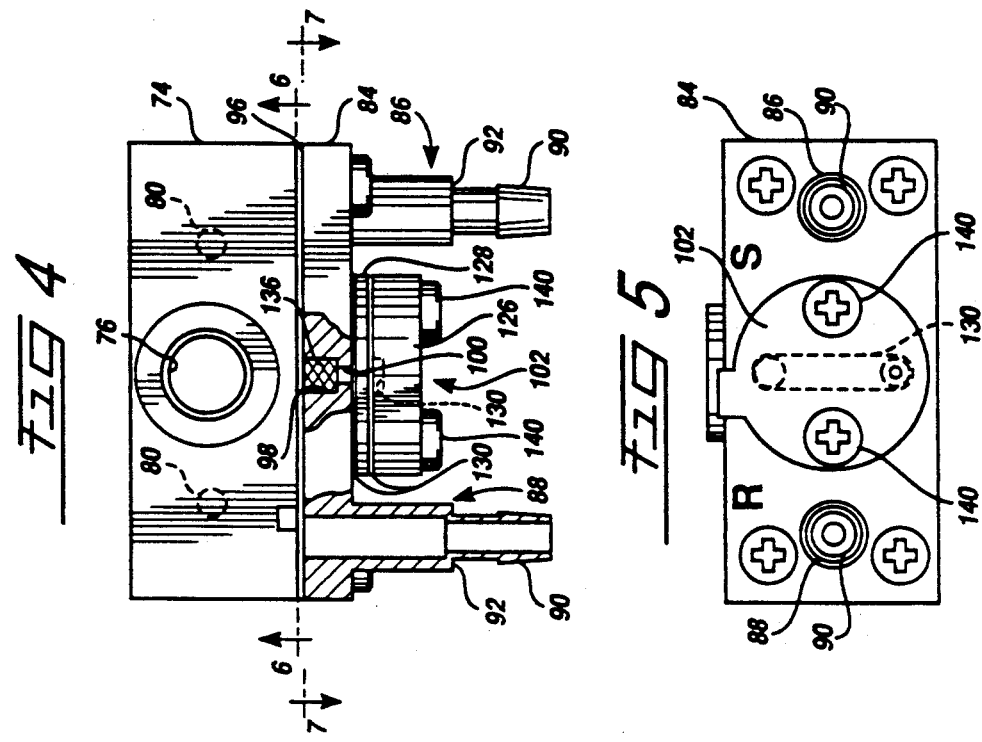

OUTPUT PRESSURE CONTROL APPARATUS

CROSS-REFERENCE TO RELATED APPLICATIONS

"Apparatus For Controlling Unit Ventilators", Ser. No. 07/714,147, filed Jun. 11, 1991, by Hurmi et al. "Cascaded Control Apparatus for Controlling Unit Ventilators", Ser. No. 07/713,655, filed Jun. 11, 1991, by Darryl G. Hurmi.

BACKGROUND OF THE PRESENT INVENTION

The present invention generally relates to pneumatic control apparatus, and more particularly to apparatus for providing an analog pneumatic output control pressure as a function of applied electrical signals.

In the art of heating, ventilating and air conditioning systems (HVAC), there are many systems which utilize pneumatic pressure control lines that extend between components of the system for controlling the operation of the system. The use of such pneumatic lines has existed for decades and systems using the same continue to be installed. As a result of the long use of such pneumatic control lines, there are thousands of systems in existence which may need to be upgraded. However, whether it is for the purpose of upgrading an existing system or interconnecting components in a new system, there is a continuing need for a regulating apparatus which reliably operates to maintain a desired pneumatic pressure in a control line for the purpose of accurately controlling the components in the system. The above cross-referenced and related application of Hurmi et al., Ser. No. 07/714,147 describes the use of pneumatic control lines in an application relating to unit ventilators.

Even though such pneumatic control lines extend to and operatively control valves, dampers and the like, which are associated with a heating and ventilating system, the modulation or regulation of the pneumatic pressure in the pneumatic control lines may be performed by electrically actuated solenoid valves which interconnect the controlled pneumatic output line with a pneumatic supply line of increased pressure and with a low pressure line or ambient atmospheric pressure. Such solenoid valves admit pressure from the supply line to the controlled line to increase the pressure and bleed pressure from the controlled line when the pressure is to be reduced.

One of the problems with such pneumatic control systems is that dust or dirt or other contaminants that may be introduced into the pneumatic control line, which may accumulate and clog small orifices that are necessary in such systems so that the pressure change in the control line will not fluctuate wildly in response to one of the solenoid valves being operated for a short time. Because of the potential for the contaminants clogging the system and thereby severely detrimentally affecting the operation of the system, filters are utilized which catch the dirt particles before they reach the small orifices. While such filters are generally effective, over a period of time they often become loaded and if there is a sufficient amount of dirt present, then the capability of passing air through them is diminished which may also detrimentally affect the operation of the system. This is generally experienced in terms of system response, i.e., when correction of the pneumatic pressure is necessary, it may take longer for the desired control pressure to be obtained in the controlled pneumatic output line. Thus, with many systems, it is necessary to service the control device and clean or replace the filters to regain optimum operation of the system. Given the fact that many systems have many devices with such filters, the maintenance costs can become significant.

Accordingly, it is an object of the present invention to provide an improved output pressure control apparatus of the general type which admits a higher supply pressure to a controlled output line when it is desired to increase the pressure in the output line and which bleeds pressure from the controlled output line when it is desired to reduce the pneumatic output pressure.

Another object of the present invention is to provide such an improved control apparatus which has the superior operating characteristics and also includes a filter means, which by virtue of the superior design of the apparatus, seldom requires cleaning of the filters.

Still another object of the present invention is to provide an improved pressure regulating apparatus of the foregoing type which requires only a single filter means and utilizes bidirectional flow of air through the filter means during normal operation which cleans the filter means.

Another object of the present invention is to provide a pneumatic control apparatus of the foregoing type, which employs a single restrictor, thereby reducing the probability that detrimental clogging of the apparatus will result.

Still another object of the present invention lies in the provision of the choice of normally opened and normally closed solenoid valves which provide maximum safety for such systems, in that a power failure will cause the system output pressure to drop to atmosphere.

Another general object of the present invention is to provide such an improved pneumatic output apparatus which is compact in size, reliable in its operation and has a modular design which facilitates installation and maintenance.

Yet another object of the present invention is to provide such a pneumatic regulating apparatus which includes an easily accessible orifice plate which can be replaced with plates having different orifice sizes to accommodate the design characteristics of the particular system in which it is installed.

Other objects and advantages will become apparent from the ensuing detailed description, while referring to the attached drawings, in which:

FIG. 1 is a schematic block diagram of the apparatus of the present invention;

FIG. 2 is a schematic block diagram illustrating the construction and operation of many pneumatic control apparatus of the prior art;

FIG. 3 is a simplified, exploded perspective of an apparatus embodying the present invention;

FIG. 4 is a side plan view of a portion, partially in section, of a portion of the apparatus embodying the present invention;

FIG. 5 is a bottom plan view of a portion of the apparatus embodying the present invention, particularly that shown in FIG. 4;

FIG. 6 is a view taken generally along the line 6-6 of FIG. 4; and

FIG. 7 is a view taken generally along the line 7—7 of FIG. 4.

DETAILED DESCRIPTION

Broadly stated, the present invention is directed to a control apparatus for providing a controlled pneumatic output in response to electrical signals being applied thereto. The apparatus includes a pair of solenoid valves which, when operated, either bleed pressure from the control output line or introduce higher pressure fluid such as air from a higher pressure supply line into the controlled output line.

As is comprehensively set forth in the patent application, Ser. No. 713,655, assigned to the same assignee as the present application, electrical circuitry can be used which operates the solenoid valves to communicate pressure from either the supply line or to atmosphere or some low pressure level for varying amounts of time, depending upon the amount of pressure change that may be necessary in the pneumatic output control line.

The present invention offers superior operational characteristics in that the response of the apparatus is fast and reliable and any contaminants that may be present in the air within the system have a lesser chance of clogging the flow of air through the apparatus because of the presence of a filter, which by virtue of the design, is self-cleaning. Additionally, the design requires only one restrictor or small orifice through which air must pass, so that the probability of clogging is reduced over many prior art apparatus which employ a restrictor in both the supply and bleed lines.

Turning now to the drawings, and particularly FIGS. 1 and 2, the apparatus embodying the present invention is schematically illustrated in FIG. 1, whereas many prior art devices are illustrated by the schematic diagram of FIG. 2.

The prior art devices have a supply line 10, a regulated pneumatic output line 12, and a bleed line 14, which is generally communicating to atmospheric pressure. A solenoid valve 16 is provided for controlling the communication of the supply line pressure to the regulated output line 12 whereas another solenoid valve 18, when opened, communicates the output line 12 to atmosphere or some reduced pressure via line 14. A restrictor 20 is located between the output line 12 and the solenoid valve 16 which controls the flow of air therethrough so as to preclude very fast, abrupt changes in pressure from occurring as a result of opening the solenoid valve. Similarly, another restrictor 22 is present between the output line and the solenoid valve 18, so that when it is desired to reduce the output pressure, opening that solenoid valve 18 will not result in very fast bleeding of the pressure. As is evident from the drawing, there are two restrictors 20, 22 and these restrictors are generally of a very small diameter, i.e., 3/1000 inch, which tend to become clogged if there is dirt or other contaminants in the system. Because it is the small orifice in the restrictor that can become clogged, it is generally the case that a filter will be placed in the line upstream of the predominant flow of air through the restrictor.

Thus, in the prior art embodiment of FIG. 2, there is a filter 24 between the restrictor 20 and the solenoid valve 16 and another filter 26 is located in the regulated output line 12 immediately upstream of the restrictor 22. While such filters are generally effective to prevent immediate clogging of the small orifice in the restrictor device, over time the filters tend to become loaded and when the loading is heavy, air cannot easily pass through them and the response time of the system will significantly decline. A pressure gauge 28 may be provided for monitoring the pressure level in the output line 12. In the event of heavy loading of the filters, it is necessary to replace the filters and it is not uncommon that such replacement may be required annually if not more frequently. Obviously, if there are many control devices within a system, the maintenance of such devices can involve a significant expense, it largely being a function of the labor costs involved in disassembling the unit, and changing out the filter.

In contrast to the prior art configuration, the apparatus embodying the present invention is shown schematically by the illustration of FIG. 1, which also includes a supply line 10', a controlled output line 12', a pair of solenoid valves 16', 18' and a port or line 14' that communicates to atmosphere. Additionally, there is a single restrictor 30 and single filter pad 32, as well as a pressure gauge 28' for observing the instantaneous pressure within the controlled line 12'. The filter pad 32 is connected through ports or lines 34 to both the solenoid valves 16' and 18'.

Unlike the prior art embodiment, the present invention has the restrictor 30 located at the output of the controlled line and has the single filter pad 32 located between the restrictor and both solenoid valves 16', 18'. This has the effect of providing bidirectional flow through the restrictor 30 and filter pad 32 which provides significant advantages. When the pressure in the controlled output line 12' is to be increased, the solenoid valve 16' is opened and supply pressure is communicated through the filter pad 32 and restrictor 30 into the controlled output line 12'. When the pressure in the output line is to be reduced, the solenoid valve 18' is opened and air moves through the restrictor 30, filter pad 32, solenoid 18' and line 14' to atmosphere. As can be appreciated, there are significant advantages in this design in that flow will be bidirectional through the filter pad 32 and the restrictor 30. By virtue of the bidirectional flow through the filter pad 32, the tendency for loading thereof is significantly reduced. Not only does loading not occur, the reverse flow through the filter tends to remove contaminants from it and thereby cleans it.

Another significant advantage of the present invention can be described with respect to the schematic illustration of FIG. 1 in that the supply solenoid valve 16' is preferably a normally closed valve which requires power for it to be opened. However, the bleed solenoid valve 18' is normally open and requires power to be applied to keep it closed. If normal operation occurs, both of the solenoid valves are controlled so as to be closed, and are actuated in such a way that they are opened for short periods of time in order to either increase or decrease the pressure in the controlled output line 12' as a function of electrical signals that are applied to the solenoid valves. A loss of power pressure in the output line 12 to atmospheric pressure. This has the effect of shutting down the system, which is desired, as opposed to pressure in the controlled output line 12' greatly increasing which could have many undesirable effects in terms of system operation.

The apparatus embodying the present invention is shown in FIGS. 3-7. As shown in the exploded perspective of FIG. 3, the apparatus, indicated generally at 34, preferably has an outer enclosure 36 comprised of an upper section 40 and a lower section 42, which are constructed to fit together in mating relation and are held by a pair of screws, one of which is shown at 44.

The two sections 42 and 44 have four cooperative holding means 46, which comprise a recess 48 defining a transverse ledge 50, to which fingers 52 in the opposite section having an inwardly directed ramp portion 54, the end of which fits over the fingers 52, to retain the two parts together so that they cannot be pulled directly away from each other. After the screws 44 and 82 are removed, one section can be moved sideways relative to the other and then the two sections can be easily separated.

The enclosure sections 40 and 42 are identical in construction, which reduces the cost of manufacture and each section includes an additional recess 56 and a large aperture 58, two smaller apertures 60 for receiving screws for securing an inner pneumatic control sub-assembly 62.

The sub-assembly 62 has a pair of solenoid valves 64 and 66, each of which have electrical conductors 68, which terminate in a connection block 70 that is adapted to receive a plug (not shown) in its apertures 72. The sub-assembly has a main manifold body 74 which will be described in detail, but which has an enlarged internally threaded aperture 76 for receiving a compatible pressure gauge 78 that is inserted through the upper section aperture 58. The manifold body 74 also has threaded apertures 80 in the bottom thereof for receiving screws 82 and 44 for securing the sub-assembly 62 to the lower section 42.

In accordance with an important aspect of the present invention, the design of the apparatus 34 is extremely compact and effective so that it can be easily used with other apparatus, such as the unit ventilator controller as set forth in the above cross-referenced application of Hurmi et al., Ser. No 07/714,147. In this regard, the overall dimensions of the enclosure 36 when the sections 40, 42 are put together, but without the presence of the pressure gauge 78, is approximately 2½ inches by 4¼ inches by 1⅛ inches. To install the apparatus 34 of the present invention, it is only necessary to connect two pneumatic lines and an electrical connector in the apertures 72 of the connector block 70.

Referring to FIGS. 4 and 5, the sub-assembly 62 includes a cover plate 84 which fits onto the manifold body 74 and it has a pair of integrally formed tubular extensions 86 and 88 that are adapted to receive pneumatic lines which are merely pressed over a conical outer portion 90 thereof to abut a transverse annulus 92. The tubular extension 86 is for connection to a source or supply of pneumatic pressure whereas the extension 88 provides the controlled or regulated pneumatic output. The solenoid valve 66 is constructed such that it has an internal port which, when it is opened, bleeds pressure from the controlled irregulated output 88 and the port extends to the left end thereof where a small muffler 94 is provided to reduce sound that is generated during operation.

In accordance with an important aspect of the present invention, the sub-assembly 62 has internal passages and ports therein for directing the flow of air therethrough so that the operation is substantially as has been described with respect to the schematic block diagram of FIG. 1. The cover plate 84 fits onto the manifold body 74 which has recesses in the face thereof which define internal passages for communicating these tubular extensions with the solenoid valves and the bleed port. At the interface between the cover 84 and the manifold body 74 is a gasket 96, preferably made of rubber or the like, and having apertures therein which correspond to the apertures shown in the cover plate 84 illustrated in FIG. 7. The apertures in the gasket 96 are substantially the same size as those illustrated except the aperture adjacent a filter for reasons that will be explained.

The cover plate 84 has a cylindrical recess 98 therein which is in communication with a smaller recess 100 that extends to the outer surface thereof where a restriction sub-assembly, indicated generally at 102, is attached. The restrictor sub-assembly 102 is adapted to control the flow of air at a predetermined flow rate so that effective control of the regulated output pressure can be obtained. This is done by requiring air to pass through a very small orifice located within the assembly, which is located near the filter.

To more readily understand the interrelationship of the restrictor sub-assembly 102, reference is made to the manifold body 74 shown in FIG. 6 and the cover plate shown in FIG. 7, which has the supply pressure being supplied through the inside 104 of the tubular extension and this communicates to a recess 106 in the manifold body. Similarly, the inside 108 of the tubular extension 88 communicates with the left end of a recess 110, which is the output of the device. The recess 110 extends from the left end portion thereof to generally the center where it communicates with an opening 112, which extends to the aperture 76, which receives the pressure gauge 78. Thus, the output pressure of the device is what is being measured by the pressure gauge 78.

The recess 104, which defines a channel for the supply pressure, communicates with an aperture 114 that communicates with the supply solenoid valve 64 and the solenoid valve also communicates through its valve mechanism to an aperture 116, which communicates in a channel defined by the recess 118, the other end of which communicates with another aperture 120 that extends to the bleed solenoid valve 66 which also communicates to an aperture 122 that has a channel 124 extending to atmosphere. (can) Depending upon the type of solenoid valve that is used, the channel 124 and aperture 122 may be used, but in the preferred embodiment illustrated, the air that is bled by operation of the solenoid valve 66 actually passes through the center of the solenoid valve to the muffler 94 as previously described.

To interconnect the passage defined by the recess 118 with the output defined by the recess 110, the restrictor sub-assembly 102 is provided and includes an outer plate 126, a restrictor plate 128, and a pair of gaskets 130. As best shown in FIGS. 4 and 5, the outer cover 126 has a recess 130 that bridges the areas 118 and 112 and the restrictor plate 128 has (see FIG. 8) a small orifice 132 aligned with one end of the recess 130 and a larger aperture 134 at the opposite end. Each of the gaskets 128 have apertures corresponding to the apertures shown in FIG. 8 so that flow of fluid can extend between the two areas 118 and 112.

A filter 136 is located within the recess 98 of the cover plate 84 and preferably comprises a cylindrical fibrous pad and it is held in place by the annular abutment defined by the difference between the diameters of the port 100 and the recess 98 on one end and by the gasket 96 on the other, with the gasket 96 having an aperture that is smaller than the size of the filter 136 so as to retain it in place. Thus, flow from the area 118 extends through the filter through the port 100 through the restriction plate orifice 132 to the recess 130 in the cover plate and air then travels to the opposite end of the recess where it travels through the opening 134 in the restrictor plate and to an aligned aperture 138 in the cover plate 84 through an aligned aperture in the gasket 96 to the area 112. By virtue of the location of the filter 136, it should be understood that operation of either solenoid valve will result in flow through the filter, with supply pressure causing flow through the filter in a upward direction as shown in FIG. 4 and reduction in pressure caused by the other solenoid valve will result in downward flow through the filter. By virtue of the bi-directional flow through the filter, it is self-cleaning.

It should also be understood by virtue of the construction that restrictor plates 128 having different sized orifices 132 may be provided and easily substituted to more closely match the flow requirements to the particular application that is intended. All that needs to be done to change a restrictor plate 128 is to remove two screws 140 which will enable the outer cover 126 and restrictor plate and gaskets 130 to be removed.

As previously mentioned, the bleed solenoid valve 66 is preferably one in which requires power to be applied to keep it closed and the supply solenoid valve 64 is preferably one in which power is required to open it, i.e., it is normally closed. By virtue of requiring power to close the bleed solenoid valve 66, if there is a power outage, then the bleed solenoid valve will open and will reduce the pressure in the regulated output line to atmosphere. This is a much safer condition in that it precludes a build up of pressure in the output line which would generally cause a heating plant to provide minimum heat output.

From the foregoing, it should be appreciated that a significantly improved pneumatic output adjusting apparatus has been shown and described which has many desirable attributes over the prior art. Such important considerations as safety, compactness of design and self-cleaning capability of a single filter located adjacent a single restrictor orifice contribute to superior operation and minimum maintenance.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for controlling the output pressure of a gaseous fluid output line adapted to be connected to said apparatus, said apparatus being adatped to be in communication with a supply of predetermined pressure above atmospheric pressure and being adapted to provide a regulated output pressure within the range of said predetermined pressure and atmospheric pressure in response to control signals being selectively applied thereto, said apparatus comprising:

a manifold assembly having an inlet means, a relief means, an outlet means adapted to be connected to the output line and internal passage means for communicating fluid among said inlet means, relief means and outlet means;

first control means located in said inlet means for selectively communicating fluid from said supply to said internal passage means to enable the fluid pressure within said internal passage means to increase, said first control means being operable in response to said control signal being applied thereto;

second control means located in said relief means for selectively communicating fluid from said internal passage means to said relief means to enable the fluid pressure within said internal passage means to decrease, said second control means being operable in response to said control signal being applied thereto;

filter means located in said outlet means for preventing dirt particles from passing through said outlet means into the output line, all of the fluid passing to and from the output line passing through said filter means; and, a restrictor means for limiting the volume of fluid passing through said outlet means.

2. Apparatus as defined in claim 1 wherein said first control means comprises an electrically operated first solenoid valve which is adapted to communicate and prohibit fluid communication from said supply to said internal passage means when open and closed, respectively.

3. Apparatus as defined in claim 2 wherein said first solenoid valve is normally closed when said control signal is not applied thereto.

4. Apparatus as defined in claim 1 wherein said second control means comprises an electrically operated second solenoid valve which is adapted to selectively communicate and prohibit fluid communication from said internal passage means to said relief means when open and closed, respectively.

5. Apparatus as defined in claim 4 wherein said second solenoid valve is normally open when said control signal is not applied thereto.

6. Apparatus as defined in claim 4 wherein said second solenoid valve has an aperture generally through the center thereof through which fluid can flow, said aperture being in fluid communication with said relief means.

7. Apparatus as defined in claim 6 wherein said relief means includes said aperture in said second solenoid valve and a muffler means that is attached to said aperture.

8. Apparatus as defined in claim 1 further including an enclosure for containing said manifold assembly, said first and second control means, said restrictor means and said filter means.

9. Apparatus as defined in claim 8 wherein said enclosure has outer dimensions of approximately 2.5 inches by 4 inches by 1 inch.

10. Apparatus for controlling the output pressure of a fluid output means, said apparatus being adapted to be in communication with a supply of predetermined pressure above atmospheric pressure and being adapted to provide a regulated output pressure within the range of said predetermined pressure and atmospheric pressure in response to control signals being selectively applied thereto, said apparatus comprising:

a manifold assembly having an inlet means, a relief means, an outlet means and internal passage means for communicating fluid among said inlet means, relief means and outlet means;

said manifold assembly comprising a manifold body, a cover plate for said manifold body and said restrictor means attached to one of said manifold body and said cover plate, said first and second control means being attached to the other of said manifold body and cover plate, said internal passage means being located in said manifold body, cover plate and restrictor means;

first control means located in said inlet means for selectively communicating fluid from said supply to said internal passage means to enable the fluid pressure within said internal passage means to increase, said first control means being operable in response to said control signal being applied thereto;

second control means located in said relief means for selectively communicating fluid from said internal passage means to said relief means to enable the fluid pressure within said internal passage means to decrease, said second control means being operable in response to said control signal being applied thereto;

filter means located in said outlet means for preventing dirt particles from passing through said outlet means; and, a restrictor means for limiting the volume of fluid passing through said outlet means.

11. Apparatus as defined in claim 10 wherein said restrictor means comprises a removable restrictor subassembly having an internal restrictor passageway adapted to pass fluid therethrough, said restrictor passageway including a reduced cross section portion for limiting the flow of fluid therethrough.

12. Apparatus as defined in claim 11 wherein said manifold body includes a plurality of channel means in the face thereof and extending in the length and width directions, said cover plate being applied to said face of said manifold body and covering said channel means to thereby define a portion of said internal passage means, said manifold body and said cover plate including apertures from outer surfaces thereof to said channel means, said apertures extending generally transversely relative to said channel means and also defining a portion of said internal passage means.

13. Apparatus as defined in claim 12 wherein said internal passage means comprises first, second, third and fourth passage portions, said first passage portion extending from said inlet means to said first control means, said second passage portion extending from said first control means to said second control means and to said restrictor subassembly, said third passage portion extending from said second control means to said relief means, and said fourth passage portion extending from said restrictor subassembly to said outlet means.

14. Apparatus as defined in claim 13 wherein said restrictor subassembly communicates fluid from said second passage portion to said fourth passage portion, said restrictor subassembly comprising:

an outer plate having said restrictor passageway on the inner face thereof, an inner plate located between said outer plate and said cover, said inner plate having a first aperture communicating fluid from said restrictor passageway to said second passage portion, and a second aperture of predetermined size communicating fluid from said restrictor passageway to said fourth passage portion, the predetermined size of said second aperture being of reduced cross sectional area so limit the flow of fluid therethrough, and means for attaching said outer plate and said inner plate to said manifold means cover plate.

15. Apparatus as defined in claim 14 further including sealing means located between said outer plate and said inner plate.

16. Apparatus as defined in claim 14 further including sealing means located between said inner plate and said manifold means cover plate.

17. Apparatus as defined in claim 15 wherein said sealing means comprises a gasket.

18. Apparatus as defined in claim 16 wherein said sealing means comprises a gasket having apertures therein coextensive with the first and second apertures of said inner plate, said apertures having a size which does not impede flow of fluid through said restrictor passageway.

19. Apparatus as defined in claim 13 wherein said filter means comprises a filter pad located in said manifold means cover plate adapted to permit flow through said restrictor means only by passing through said filter pad.

20. Apparatus as defined in claim 19 wherein said cover plate includes an enlarged recess adjacent said restrictor means, said recess receiving said filter pad therein.

21. Apparatus as defined in claim 20 further including a gasket located between said manifold body and said manifold cover plate, said gasket including two apertures therein for communicating fluid through said restrictor means from said second passage portion and said fourth passage portion, one of said apertures being coextensive with said enlarged recess of said manifold cover plate and having a cross sectional area smaller than said recess to thereby retain said filter pad within said recess.

22. Apparatus as defined in claim 13 further including pressure measuring means adapted to measure the fluid pressure in said second passage portion.

23. Apparatus as defined in claim 22 wherein said manifold body includes a threaded aperture therein communicating the outside of said body with said second passage portion, said pressure measuring means comprises a pressure gauge having a threaded conduit adapted to be threadably connected to said manifold body.

24. Apparatus as defined in claim 11 wherein said outlet means includes an elongated cylindrical extension integrally formed with said manifold means cover plate adapted to receive a flexible pneumatic conduit.

25. Apparatus as defined in claim 11 wherein said inlet means includes an elongated cylindrical extension integrally formed with said manifold means cover plate adapted to receive a flexible pneumatic conduit.

26. Apparatus for controlling the output pressure of a pneumatic output line adapted to be connected to said apparatus, said apparatus being adapted to be in communication with a gaseous supply of predetermined pressure above atmospheric pressure and being adapted to provide an output pressure within the range of said predetermined pressure and atmospheric pressure in response to a control signal being selectively applied thereto, said apparatus comprising:

a manifold assembly having an inlet means, a relief means, an outlet means adapted to be connected to the output line, a pressure measuring port means and internal passage means for communicating gaseous fluid among said inlet means, relief means, pressure measuring port means and outlet means;

first control means located in said inlet means for selectively communicating gaseous fluid from said supply to said internal passage means to enable the gaseous fluid pressure within said internal passage means to increase, said first control means being operable in response to said control signal being applied thereto;

second control means located in said relief means for selectively communicating gaseous fluid from said internal passage means to said relief means to enable the gaseous fluid pressure within said internal passage means to decrease, said second control means being operable in response to said control signal being applied thereto;

filter means located in said outlet means for preventing dirt particles from passing through said outlet means into the output line, all of the fluid passing to and from the output line passing through said filter means; and, a restrictor means for limiting the volume of gaseous fluid passing through said outlet means.

27. Apparatus as defined in claim 26 wherein said first control means comprises an electrically operated first solenoid valve which is adapted to communicate and prohibit fluid communication from said supply to said internal passage means when open and closed, respectively.

28. Apparatus as defined in claim 27 wherein said first solenoid valve is normally closed when said control signal is not applied thereto.

29. Apparatus as defined in claim 26 wherein said second control means comprises an electrically operated second solenoid valve which is adapted to selectively communicate and prohibit fluid communication from said internal passage means to said relief means when open and closed, respectively.

30. Apparatus as defined in claim 29 wherein said second solenoid valve is normally open when said control signal is not applied thereto.

31. Apparatus for controlling the output pressure of a pneumatic output means, said apparatus being adapted to be in communication with a gaseous supply of predetermined pressure above atmospheric pressure and being adapted to provide an output pressure within the range of said predetermined pressure and atmospheric pressure in response to a control signal being selectively applied thereto, said apparatus comprising:

a manifold assembly having an inlet means, a relief means, an outlet means, a pressure measuring port means and internal passage means for communicating gaseous fluid among said inlet means, relief means, pressure measuring port means and outlet means;

said manifold assembly comprising a manifold body, a cover plate for said manifold body and said restrictor means attached to one of said manifold body and said cover plate, said first and second control means being attached to the other of said manifold body and cover plate, said internal passage means being located in said manifold body, cover plate and restrictor means;

first control means located in said inlet means for selectively communicating gaseous fluid from said supply to said internal passage means to enable the gaseous fluid pressure within said internal passage means to increase, said first control means being operable in response to said control signal being applied thereto;

second control means located in said relief means for selectively communicating gaseous fluid from said internal passage means to said relief means to enable the gaseous fluid pressure within said internal passage means to decrease, said second control means being operable in response to said control signal being applied thereto;

filter means located in said outlet means for preventing dirt particles from passing through said outlet means; and, a restrictor means for limiting the volume of gaseous fluid passing through said outlet means.

32. Apparatus as defined in claim 31 wherein said restrictor means comprises a removable restrictor subassembly having an internal restrictor passageway adapted to pass fluid therethrough, said restrictor passageway including a reduced cross section portion for limiting the flow of fluid therethrough.

33. Apparatus as defined in claim 31 wherein said manifold body includes a plurality of channel means in the face thereof and extending in the length and width directions, said cover plate being applied to said face of said manifold body and covering said channel means to thereby define a portion of said internal passage means, said manifold body and said cover plate including apertures from outer surfaces thereof to said channel means, said apertures extending generally transversely relative to said channel means and also defining a portion of said internal passage means.

34. Apparatus as defined in claim 33 wherein said internal passage means comprises first, second, third and fourth passage portions, said first passage portion extending from said inlet means to said first control means, said second passage portion extending from said first control means to said second control means and to said restrictor subassembly, said third passage portion extending from said second control means to said relief means, and said fourth passage portion extending from said restrictor subassembly to said outlet means.

35. Apparatus as defined in claim 34 wherein said restrictor subassembly communicates fluid from said second passage portion to said fourth passage portion, said restrictor subassembly comprising:

an outer plate having said restrictor passageway on the inner face thereof, an inner plate located between said outer plate and said cover, said inner plate having a first aperture communicating fluid from said restrictor passageway to said second passage portion, and second aperture of predetermined size communicating fluid from said restrictor passageway to said fourth passage portion, the predetermined size of said second aperture being of reduced cross sectional area so limit the flow of fluid therethrough, and means for attaching said outer plate and said inner plate to said manifold means cover plate.

36. Apparatus as defined in claim 35 further including first sealing means located between said outer plate and said inner plate.

37. Apparatus as defined in claim 35 further including second sealing means located between said inner plate and said manifold means cover plate.

38. Apparatus as defined in claim 36 wherein said first sealing means comprises a gasket.

39. Apparatus as defined in claim 37 wherein said second sealing means comprises a gasket having apertures therein coextensive with the first and second apertures of said inner plate, said apertures having a size which does not impede flow of fluid through said restrictor passageway.

40. Apparatus as defined in claim 31 wherein said filter means comprises a filter pad located in said manifold means cover plate adapted to permit flow through said restrictor means only by passing through said filter pad.

41. Apparatus as defined in claim 40 wherein said cover plate includes an enlarged recess adjacent said restrictor means, said recess receiving said filter pad therein.

42. Apparatus as defined in claim 41 further including a gasket located between said manifold body and said manifold cover plate, said gasket including two apertures therein for communicating fluid through said restrictor means from said second passage portion and said fourth passage portion, one of said apertures being coextensive with said enlarged recess of said manifold cover plate and having a cross sectional area smaller than said recess to thereby retain said filter pad within said recess.

* * * * *